United States Patent
Sasaki et al.

(10) Patent No.: US 9,742,041 B2
(45) Date of Patent: Aug. 22, 2017

(54) LITHIUM ION SECONDARY BATTERY SYSTEM

(71) Applicant: NEC Corporation, Tokyo (JP)

(72) Inventors: Hideaki Sasaki, Tokyo (JP); Takehiro Noguchi, Tokyo (JP); Yuukou Katou, Tokyo (JP); Makiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/023,789

(22) PCT Filed: Sep. 29, 2014

(86) PCT No.: PCT/JP2014/075949
§ 371 (c)(1),
(2) Date: Mar. 22, 2016

(87) PCT Pub. No.: WO2015/046531
PCT Pub. Date: Apr. 2, 2015

(65) Prior Publication Data
US 2016/0218397 A1    Jul. 28, 2016

(30) Foreign Application Priority Data

Sep. 30, 2013 (JP) .................................. 2013-205798

(51) Int. Cl.
*H01M 4/02* (2006.01)
*H01M 10/42* (2006.01)
(Continued)

(52) U.S. Cl.
CPC ....... *H01M 10/4207* (2013.01); *H01M 4/505* (2013.01); *H01M 4/525* (2013.01); *H01M 4/587* (2013.01); *H01M 4/5825* (2013.01); *H01M 10/0525* (2013.01); *H01M 10/0569* (2013.01); *H01M 10/441* (2013.01); *H01M 10/46* (2013.01); *H01M 10/615* (2015.04);
(Continued)

(58) Field of Classification Search
CPC ....................................................... H01M 4/02
See application file for complete search history.

(56) References Cited

U.S. PATENT DOCUMENTS

2011/0187183 A1* 8/2011 Kimura ................ B60L 11/005
307/9.1

FOREIGN PATENT DOCUMENTS

| JP | 2004-111242 | 4/2004 |
|---|---|---|
| JP | 2006-121874 | 5/2006 |
| JP | 2011-160640 | 8/2011 |

OTHER PUBLICATIONS

International Search Report and Written Opinion mailed Nov. 18, 2014 in corresponding PCT International Application.

* cited by examiner

*Primary Examiner* — Jacob Marks
(74) *Attorney, Agent, or Firm* — Finnegan, Henderson, Farabow, Garrett & Dunner, L.L.P.

(57) ABSTRACT

An object of the present invention is to provide a battery system improved in output characteristics and/or storage characteristic while taking advantage of high energy density of a lithium ion secondary battery comprising a positive electrode containing a positive electrode active material having an operating potential of 4.5 V or more relative to a lithium metal. The present invention relates to a battery system having a first battery consisting of a 5 V-level battery(s), a second battery consisting of a 4 V-level battery(s), and a control system.

11 Claims, 4 Drawing Sheets

(51) Int. Cl.
    *H01M 4/505*     (2010.01)
    *H01M 4/525*     (2010.01)
    *H01M 10/0525*     (2010.01)
    *H01M 10/0569*     (2010.01)
    *H01M 10/44*     (2006.01)
    *H01M 16/00*     (2006.01)
    *H01M 10/615*     (2014.01)
    *H02J 7/00*     (2006.01)
    *H01M 10/625*     (2014.01)
    *H01M 10/657*     (2014.01)
    *H01M 4/58*     (2010.01)
    *H01M 4/587*     (2010.01)
    *H01M 10/46*     (2006.01)
    *H01M 10/66*     (2014.01)

(52) U.S. Cl.
    CPC ....... *H01M 10/625* (2015.04); *H01M 10/657* (2015.04); *H01M 10/66* (2015.04); *H01M 16/00* (2013.01); *H02J 7/0013* (2013.01); *H01M 2004/027* (2013.01); *H01M 2004/028* (2013.01); *H01M 2220/20* (2013.01); *Y02E 60/122* (2013.01)

10: Battery control unit
11: Internal output control device
12: Temperature measuring unit
13: DOD arithmetic unit
14: Determination unit
15: Current control unit
18: Heating portion
19: External output control unit
20: Load device

LITHIUM ION SECONDARY BATTERY SYSTEM

CROSS-REFERENCE TO RELATED PATENT APPLICATIONS

This application is a National Stage Entry of International Application No. PCT/JP2014/075949, filed Sep. 29, 2014, which claims priority from Japanese Patent Application No. 2013-205798, filed Sep. 30, 2013. The entire contents of the above-referenced applications are expressly incorporated herein by reference.

TECHNICAL FIELD

The present invention relates to a battery system having a lithium ion secondary battery.

BACKGROUND ART

Lithium ion secondary batteries, which are small in volume and large in mass capacity density and provide a high voltage, have been widely employed as power supply sources for small devices. Lithium ion secondary batteries are, for example, used as power sources for mobile devices such as mobile phones and notebook computers. Recently, in addition to the application to the small mobile devices, since environmental concern and energy conservation trend are increased, lithium ion secondary batteries have been applied to large secondary batteries required to have a large capacity and a long life to be used in the fields of electric vehicles (EV), power storage and the like.

In the lithium ion secondary batteries currently on the market, a positive electrode active material based on $LiMO_2$ (M represents at least one of Co, Ni and Mn) of a laminate structure or $LiMn_2O_4$ of a spinel structure is generally used. A lithium ion secondary battery having such a positive electrode active material uses a charge/discharge region of principally 4.3 V or less (hereinafter, a positive electrode containing a positive electrode active material having an operating potential of 4.3 V or less relative to a lithium metal will be sometimes referred to as a "4 V-level positive electrode"). As a negative-electrode active material, a carbon material such as graphite is used.

In the meantime, a material obtained by substituting Mn of $LiMn_2O_4$ partially with Ni and the like is known to exhibit a charge/discharge region as high as 4.5 to 4.8 V relative to a lithium metal. More specifically, a spinel compound, such as $LiNi_{0.5}Mn_{1.5}O_4$, does not use conventional redox between $Mn^{3+}$ and $Mn^{4+}$ but uses redox of $Ni^{2+}$ and $Ni^{4+}$, since Mn is present in the state of $Mn^{4+}$. Because of this, the spinel compound exhibits an operating voltage as high as 4.5 V or more relative to a lithium metal. Such a material, which is called as a 5 V-level active material and can improve energy density by applying a high voltage, is expected as a promising positive electrode material. Hereinafter, a positive electrode comprising the 5 V-level active material will be sometimes referred to as a "5 V-level positive electrode".

However, if the positive electrode potential increases, reduction in battery capacity and gas generation become significant due to oxidative decomposition of the electrolyte solution. Because of this, there is a problem in the application of a generally-used electrolyte mainly containing a carbonate-based solvent. In the circumstances, in order to suppress decomposition of the electrolyte solution at a high potential, investigation as to whether a solvent having high oxidation resistance is applied to an electrolyte solution of a lithium ion secondary battery comprising a 5 V-level positive electrode has been made. For example, a fluorine solvent such as fluorinated ether and fluorinated phosphoric acid ester and a sulfone solvent such as sulfolane have been reported as highly oxidation-resistant solvents. In particular, it is believed that a fluorine solvent is excellent in oxidation resistance.

However, since the above solvents that can be used in a battery using a 5 V-level positive electrode (hereinafter referred to also as a 5 V-level battery) cause decrease in ion conductivity and increase in viscosity, as compared to a carbonate solvent, they have a problem of deterioration of rate characteristics (output characteristics) of the battery. Even if an oxidation-resistant solvent is used, the following problem still remains in a 5 V-level battery: life characteristics such as cycle characteristic and storage characteristics are lower than those of the battery using a 4 V-level positive electrode (hereinafter referred to as a 4 V-level battery). This problem prevents practical use of the 5 V-level battery.

When sufficient performance cannot be obtained by a single type of battery alone, a method is considered in which a second and a third battery different in type from this are prepared and these plural types of batteries are controlled in combination to improve the characteristics as a battery system (Patent Literature 1).

CITATION LIST

Patent Literature

Patent Literature 1: Japanese Patent Laid-Open No. 2004-111242

SUMMARY OF INVENTION

Technical Problem

However, in order to solve the aforementioned problems with a 5 V-level battery, using different types of batteries in combination with a 5 V-level battery and a controlling method thereof have not yet been investigated, up to present.

Then, an object of the present invention is to provide a battery system which can solve the aforementioned problems while taking advantage of a high energy density of a 5 V-level battery.

Solution to Problem

The present invention relates to the following matters.

A first aspect of the present invention relates to a battery system comprising:

a first battery including a lithium ion secondary battery having a positive electrode containing a positive electrode active material having an operating potential of 4.5 V or more relative to a lithium metal, a second battery including a lithium ion secondary battery having a positive electrode containing a positive electrode active material having an operating potential of 4.3 V or less relative to a lithium metal, and a mechanism for outputting power outside from both the first battery and the second battery, in which the discharge rate of the first battery is equal to or less than the discharge rate of the second battery.

A second aspect of the present invention relates to a battery system comprising:

a first battery including a lithium ion secondary battery having a positive electrode containing a positive electrode active material having an operating potential of 4.5 V or more relative to a lithium metal, a second battery including a lithium ion secondary battery having a positive electrode containing a positive electrode active material having an operating potential of 4.3 V or less relative to a lithium metal, and a mechanism for charging the second battery by outputting power thereto from the first battery, in which the depth of discharge (DOD) of the first battery is higher than the depth of discharge (DOD) of the second battery during non-load time.

A third aspect of the present invention relates to a battery system comprising:

a first battery including a lithium ion secondary battery having a positive electrode containing a positive electrode active material having an operating potential of 4.5 V or more relative to a lithium metal and a heating portion, a second battery including a lithium ion secondary battery having a positive electrode containing a positive electrode active material having an operating potential of 4.3 V or less relative to a lithium metal, and a mechanism for heating the first battery by outputting power from the second battery to the heating portion of the first battery.

Advantageous Effects of Invention

According to the present invention, it is possible to provide a battery system improved in output characteristics and/or storage characteristics while taking advantage of high energy density of a lithium ion secondary battery (5 V-level battery) having a positive electrode containing a positive electrode active material having an operating potential of 4.5 V or more relative to a lithium metal.

DESCRIPTION OF EMBODIMENTS

The first aspect of the embodiment of the present invention relates to a battery system comprising:

a first battery including a lithium ion secondary battery having a positive electrode containing a positive electrode active material having an operating potential of 4.5 V or more relative to a lithium metal, a second battery including a lithium ion secondary battery having a positive electrode containing a positive electrode active material having an operating potential of 4.3 V or less relative to a lithium metal, a mechanism for outputting power outside from both the first battery and the second battery, in which the discharge rate of the first battery is equal to or less than the discharge rate of the second battery.

The second aspect of the embodiment of the present invention relates to a battery system comprising:

a first battery including a lithium ion secondary battery having a positive electrode containing a positive electrode active material having an operating potential of 4.5 V or more relative to a lithium metal, a second battery including a lithium ion secondary battery having a positive electrode containing a positive electrode active material having an operating potential of 4.3 V or less relative to a lithium metal, and a mechanism for charging the second battery by outputting power thereto from the first battery, in which the depth of discharge (DOD) of the first battery is higher than the depth of discharge (DOD) of the second battery during non-load time.

The third aspect of the embodiment of the present invention relates to a battery system comprising:

a first battery including a lithium ion secondary battery having a positive electrode containing a positive electrode active material having an operating potential of 4.5 V or more relative to a lithium metal and a heating portion, a second battery including a lithium ion secondary battery having a positive electrode containing a positive electrode active material having an operating potential of 4.3 V or less relative to a lithium metal, and a mechanism for heating the first battery by outputting power from the second battery to the heating portion of the first battery.

In the present specification, a lithium ion secondary battery having a positive electrode containing a positive electrode active material having an operating potential of 4.5 V or more relative to a lithium metal will be sometimes referred to as a "5 V-level battery". A lithium ion secondary battery having a positive electrode containing a positive electrode active material having an operating potential of 4.3 V or less relative to a lithium metal will be sometimes referred to as a "4 V-level battery".

First, characteristics of the 5 V-level battery and 4 V-level battery when they are each individually used will be described.

Figure 1:
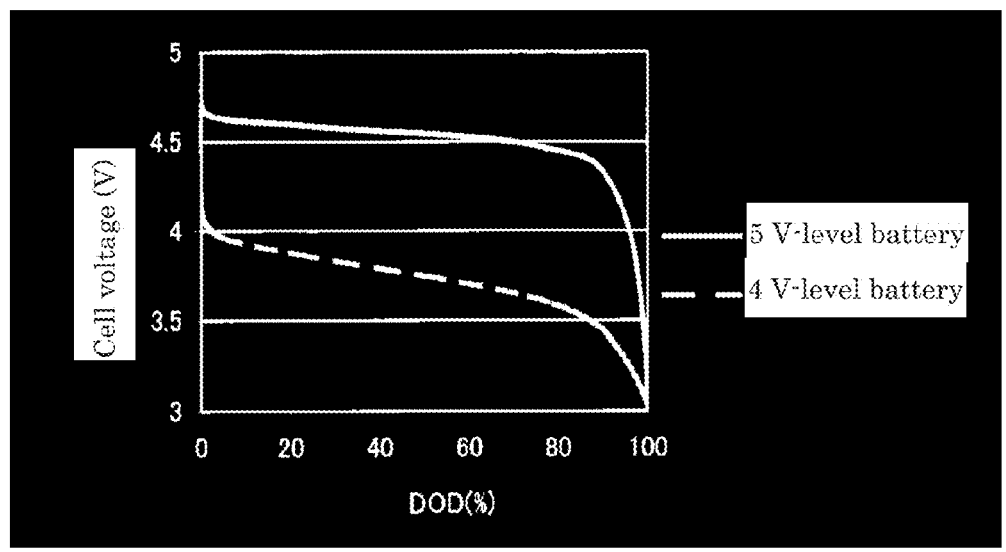
FIG. 1 is a graph showing the discharge characteristics of a 5 V-level battery and a 4 V-level battery.

FIG. 1 shows the respective discharge curves of the 5 V-level battery and the 4 V-level battery obtained by measurement at 25° C. and 0.2 C. In FIG. 1, the abscissa axis shows the depth of discharge (DOD) (%), and the vertical axis shows cell voltage. Battery a was used as the 5 V-level battery, and Battery b was used as the 4 V-level battery. Herein, in Battery a as the 5 V-level battery, $LiNi_{0.5}Mn_{1.5}O_4$ was used as a positive electrode active material in the positive electrode, graphite was used as a negative-electrode active material in the negative electrode, and a solution, which is prepared by blending ethylene carbonate (EC), fluorinated ether (FE) represented by $H(CF_2)_2 CH_2OCF_2CF_2H$, a fluorinated phosphoric acid ester (FP) represented by $O=P(OCH_2CF_3)_3$ and a cyclic sulfone compound represented by $C_4H_8SO_2$, i.e., sulfolane (SL), in a ratio of EC:SL:FE:FP=10:20:50:20 to prepare a mixture and dissolving $LiPF_6$ in the mixture in a concentration of 0.9 mol/L, was used as the electrolyte solution. In Battery b as the 4 V-level battery, a mixture containing $LiMn_2O_4$ and $LiNiO_2$ in a ratio of 8:2 was used as a positive electrode active material in the positive electrode, graphite was used as a negative-electrode active material in the negative electrode, and a solution, which is prepared by blending EC and DMC in a ratio of 4:6 to prepare a mixture and dissolving $LiPF_6$ in a concentration of 1.0 mol/L in the mixture, was used as the electrolyte solution. As an outer package, a laminate film was used in both Battery a and Battery b. In this manner, a battery of about 1 Ah was formed. The upper limit voltage and the lower limit voltage during charge-discharge time were specified as 4.75 V and 3V, respectively, in the 5 V-level battery, and as 4.2 V and 3V, respectively, in the 4 V-level battery.

The discharge capacity of the positive electrode active material per weight in each of the batteries was about 130 mAh/g. From FIG. 1, it is found that the 5 V-level battery has a voltage higher by 0.7 V or more than that of the 4 V-level battery and can obtain a higher energy density by the difference in voltage.

Figure 2:
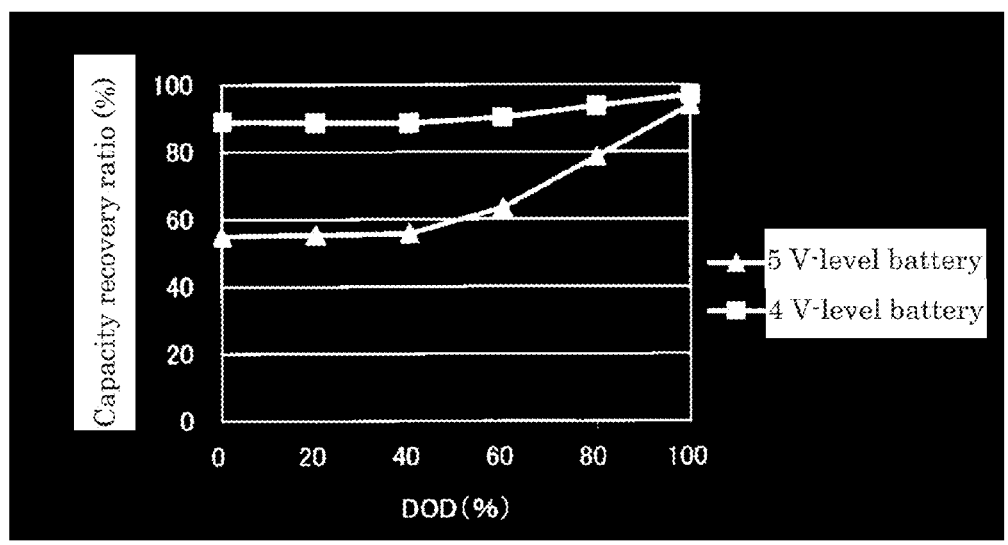
FIG. 2 is a graph showing the capacity recovery ratios of a 5 V-level battery and a 4 V-level battery.

FIG. 2 shows capacity recovery ratios (%) of Battery a (5 V-level battery) and Battery b (4 V-level battery) mentioned above, after they were set so as to have a depth of discharge (DOD) of 0% and stored at 45° C. for 8 weeks. The capacity recovery ratio (%), which is obtained by calculation (B/A× 100(%)), is the ratio of the discharge capacity (B) of a battery (which was stored and then subjected to a discharge and charge operation followed by re-discharge operation) relative to discharge capacity (A) before storage. From the results of FIG. 2, it is found that the capacity recovery ratio of the 5 V-level battery is lower than the capacity recovery ratio of the 4 V-level battery. More specifically, it was shown that the 5 V-level battery has a problem in that the capacity deterioration at a high temperature is more significant than that of the 4 V-level battery.

In addition, the volume increases in the 5 V-level battery and the 4 V-level battery both fell within 5% or less, and gas generation of the 5 V-level battery at high temperature was sufficiently suppressed. In contrast, when the electrolyte solution of Battery a (5 V-level battery) was replaced with the electrolyte solution of Battery b (4 V-level battery), the cell volume after storage at 45° C. for one week increased by 50% or more. From this, it was demonstrated that a problem of gas generation at the high temperature can be reduced if a highly oxidation-resistant electrolyte solution is used in the 5 V-level battery.

Figure 3:
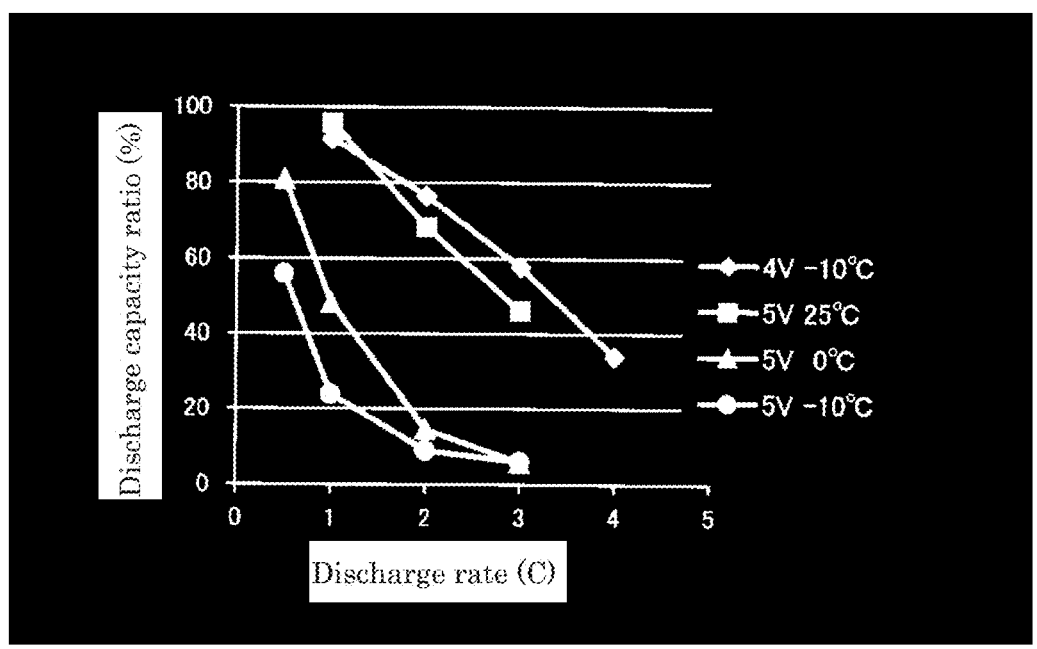
FIG. 3 is a graph showing discharge rate characteristics of a 5 V-level battery and a 4 V-level battery at respective temperatures.

FIG. 3 shows the discharge rate characteristics of Battery a (5 V-level battery) at 25° C., 0° C., and −10° C. and the discharge rate characteristics of Battery b (4 V-level battery) at −10° C. The "discharge capacity ratio (%)" herein is the ratio of discharge capacity of each of the secondary batteries relative to the discharge capacity at 25° C. and 0.2 C as the rating capacity. It was demonstrated that the discharge capacity of the 5 V-level battery at 25° C. is close to the discharge capacity of the 4 V-level battery at −10° C. It was also demonstrated that the discharge capacity of the 5 V-level battery at 0° C. or lower and 1 C or more significantly decreases to as low as 50% or less.

The battery to be used in electric vehicles is not required to constantly produce higher power but required to keep a capacity of a certain level or higher at a discharge rate of about 1 C. For example, when the running distance of an electric vehicle fully charged is 150 km, the car runs for 2.5 hours at a speed of 60 km per hour. In this case, the discharge rate of the battery is 0.4 C. However, it is desired that the battery can work in a low-temperature environment at 0° C. or lower and can provide a capacity of a similar level to that obtained at room temperature. Because of this, improvement is required in terms of a reduction in the discharge capacity of the 5 V-level battery at low temperature.

In the circumstances, the present inventors used a 5 V-level battery and a 4 V-level battery in combination to construct a battery system and conducted intensive studies. As a result, they found a method for controlling the battery system by which the aforementioned problems of the 5 V-level battery can be overcome.

Figure 4:
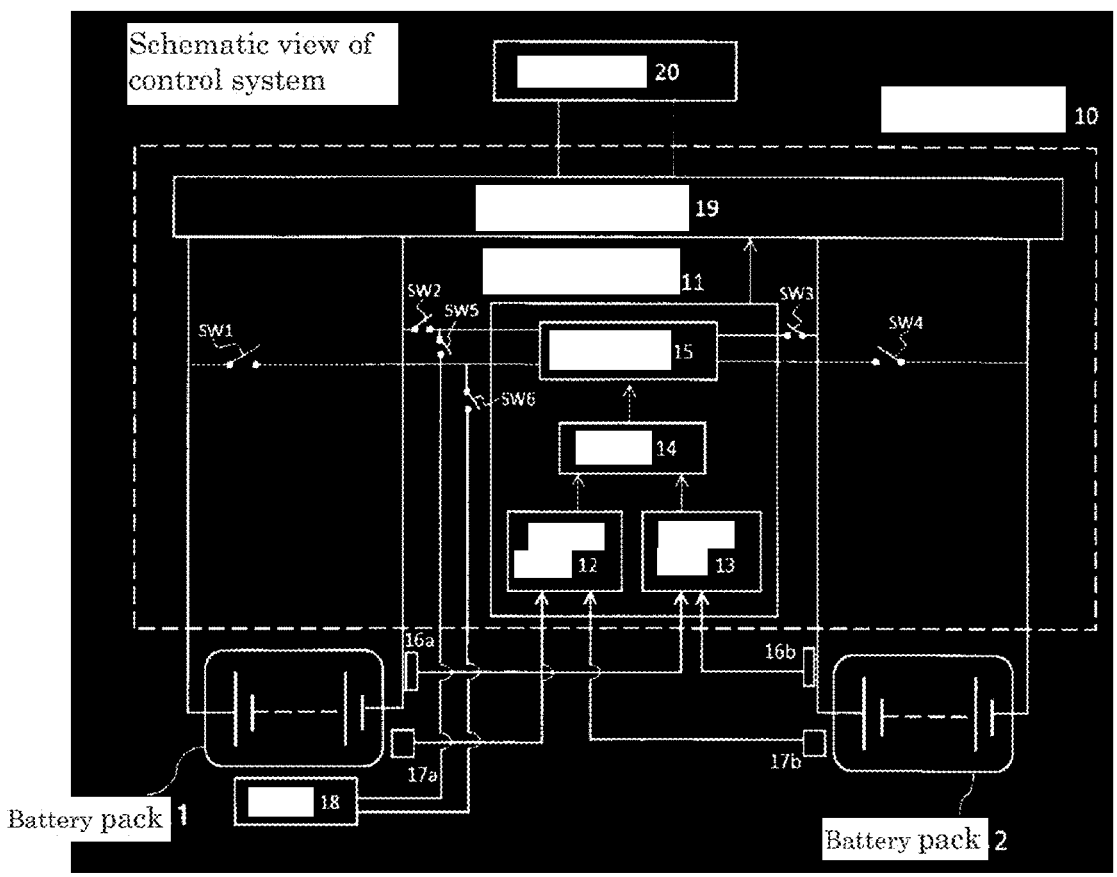
FIG. 4 is a schematic view showing an example of a battery system according to the embodiment of the present invention.

FIG. 4 shows a schematic view of an example of the battery system according to the embodiment of the present invention. Battery pack 1 consists of a plurality of 5 V-level batteries. Battery pack 2 consists of a plurality of 4 V-level batteries. In the battery packs, single batteries are connected in series or in parallel. Battery pack 1 and battery pack 2 are connected to an exterior load device 20 via a battery control unit 10. The battery control unit 10 has an external output control unit 19 that is connected to the load device 20. The battery control unit 10 is preferably constituted of an internal output control unit 11 and the external output control unit 19. In this figure, although the external output control unit 19 and the internal output control unit 11 are shown as discrete units, they may be integrated as one unit in practice.

The external output control unit 19 is a device which merges power taken out from battery pack 1 and power taken out from battery pack 2 and supplies the merged power to the load device 20, and controls the respective amounts of current (discharge rates) during taking out power from battery pack 1 and power from battery pack 2. Current/voltage of each of the battery packs can be controlled by a current control device such as a DC-DC converter provided inside the control device (not shown in FIG. 4). In the embodiment of the present invention, it is preferable to control the discharge rate (R1) of battery pack 1 consisting of 5 V-level batteries so as to be equal to or lower than the discharge rate (R2) of battery pack 2 consisting of 4 V-level batteries; more preferable to control R1 so as to be lower than R2; and further preferable to control the ratio of R1 and R2 (R2/R1) so as to fall within the range of 1.5 to 2.7.

In the embodiment of the present invention, an internal output control unit 11 is a device, which does not control the load device 20 but controls input/output of power within the battery system, preferably has a mechanism for charging battery pack 2 with power from battery pack 1 and/or a mechanism which takes out power for heating battery pack 1 from battery pack 2.

The internal output control unit 11 preferably has a temperature measuring unit 12 for measuring the temperature of each of battery pack 1 and battery pack 2 and/or a DOD arithmetic unit 13 for computationally obtaining the depth of discharge (DOD). The temperature measuring unit 12 receives signals from temperature sensors 17a, 17b, which are respectively provided around battery pack 1 and battery pack 2, and converts the signals into temperature values. The DOD arithmetic unit 13 receives a current value from current sensors 16a, 16b, which are respectively connected to current cables of battery pack 1 and battery pack 2, and computationally obtains the depth of discharge (DOD) by calculating a discharge capacity value based on the current value and discharge time and comparing the discharge capacity value to a predetermined battery capacity value. The resultant DOD value is corrected by applying an open-circuit voltage value to this value. In this manner, the accuracy of the DOD value can be more improved.

Examples of the current sensor include those of a shunt resistance system, a magnetic proportional system and a magnetic balance system. Among them, a non-contact magnetic proportional system and a magnetic balance system are preferable.

A control method and a control value are determined by a determination unit 14 based on the temperature of a battery and/or depth of discharge (DOD) and presence or absence and the level of power to be output to the load device. Based on the determination results, a current control unit 15 switches the direction of current flow and supplies a current of a predetermined value. The determination unit 14 has a storage unit in which data required for control are previously recorded. Data pieces such as temperature and depth of discharge (DOD) can be stored one by one into the storage unit and can be referred to at any time.

In the embodiment of the present invention, it is preferable that when the battery system is in a non-load condition, battery pack 2 (consisting of 4 V-level batteries) be charged with power from battery pack 1 (consisting of 5 V-level batteries) to control the depth of discharge (DOD) of the 5 V-level batteries to be larger than the depth of discharge (DOD) of the 4 V-level batteries. In this manner, deterioration of the battery capacity in the battery system can be suppressed. In addition, it is more preferable that the depth of discharge of battery pack 1 is maximized and the depth of discharge of battery pack 2 is minimized.

In the embodiment of the present invention, when battery pack 1 (5 V-level batteries) and battery pack 2 (4 V-level batteries) are charged by a power supply source outside the battery system, it is sometimes preferable that battery pack 2 is preferentially charged. Accordingly, when power is taken out from battery pack 1 and battery pack 2, the discharge rate (R1) of battery pack 1 (consisting of 5 V-level batteries) can be easily controlled to be equal to or lower than the discharge rate (R2) of battery pack 2 (consisting of 4 V-level batteries). In addition, since the capacity of the 5 V-level batteries significantly deteriorates compared to that of the 4 V-level batteries when they are stored at high temperature, deterioration of the entire capacity of the battery system can be reduced.

As shown in FIG. 3, if the 5 V-level battery is placed at a temperature as low as 0° C. or lower, for example, the discharge capacity thereof becomes 50% or less of the rating capacity, and thus the 5 V-level battery has a problem with the low-temperature characteristics. Therefore, when the 5 V-level battery is placed in the low temperature state, it is preferably heated to raise the temperature because the discharge capacity can be increased. In contrast, in the 4 V-level battery, since sufficient discharge capacity can be obtained even at −10° C. and a rate of 1 C (FIG. 3), the effect of raising the temperature by such heating is lower than that in the case of the 5 V-level battery.

When the 5 V-level battery is placed at a temperature as low as 0° C. or lower, it is preferable to heat the 5 V-level battery in such a manner that the temperature thereof falls preferably within the range of higher than 0° C. and 30° C. or lower, more preferably higher than 0° C. and 25° C. or lower, further preferably 15° C. or higher and 25° C. or lower, and still preferably 20° C. or higher and 25° C. or lower. For example, it is preferable that the temperature of the 5 V-level battery is about 25° C. because a discharge capacity of about 90% or more, which is practically sufficient value, can be obtained at a rate of 1 C. In contrast, it is not preferable that the temperature is extremely high because the deterioration of the battery is accelerated. In the embodiment of the present invention, it is not necessary to provide a new power source. The power for heating the 5 V-level battery is preferably supplied from the 4 V-level battery. More specifically, in the embodiment of the present invention, when the 5 V-level battery is placed at a temperature as low as 0° C. or lower, the 5 V-level battery is preferably heated by use of power from the 4 V-level battery. In heating the 5 V-level battery, for example, if the self-power of the 5 V-level battery is used, the battery may be sometimes not heated up to a preset temperature because the power generated from the 5 V-level battery is low at low temperature; however, the battery can be efficiently heated by using the power of the 4 V-level battery.

If the battery control unit 10 has an internal output control unit, the external output control unit 19 is communicated with the internal output control unit 11, receives requisite information such as temperature of battery and depth of discharge (DOD) state, and determines the amounts of current to be supplied to battery pack 1 and battery pack 2 in outputting power to the load device.

In FIG. 4, in the battery control unit 10, there are three pathways: (i) a pathway for outputting power from battery pack 1 and battery pack 2 to the load device 20, (ii) a pathway for charging battery pack 2 with power from battery pack 1 and (iii) a pathway for supplying power from battery pack 2 to the heating portion. SW1 to SW6 represent switching elements for switching current flow.

When SW1 to 6 are all opened, a pathway for outputting power from battery pack 1 and battery pack 2 to the load device 20 by way of the external output control unit 19 is formed.

When SW1 to 4 are all closed and SW5 and 6 are opened, a current pathway between battery pack 1 and battery pack 2 by way of the current control unit 15 is formed. This pathway is used for charging battery pack 2 with power from battery pack 1.

When SW1 and 2 are opened and SW3 to 6 are all closed, a pathway for supplying current from battery pack 2 to the heating portion by way of the current control unit 15 can be formed. The heating portion has a heater, which generates heat by being supplied with current and raises the temperature of battery pack 1. As the heater, a resistance heating element can be used. As the shape of the heater, which is not particularly limited, a film heater is preferably used, which can make uniform heating by coming into close contact with a battery.

An example of operation of the control system in the external output control unit 19 will be described below.

When the external output control unit 19 is instructed to supply power to the load device 20, the unit receives data such as temperature and depth of discharge (DOD) of battery pack 1 and battery pack 2 through the internal output control unit 11 and determines the amounts of current to be supplied to battery pack 1 and battery pack 2 depending upon the amount of power to be output to the load device 20. For example, in the case where the both batteries have a temperature of 25° C. and require a current having the discharge rate corresponding to 1 C, since a capacity corresponding to 90% or more of the rating capacity can be obtained in both battery pack 1 and battery pack 2, control is made in such a manner that the current corresponding to 1 C is supplied to both battery packs. If the batteries have a temperature of 0° C., since the discharge capacity of battery pack 1 becomes approximately a half of that of battery pack 2, the discharge rate of battery pack 1 is reduced to less than 1 C; and the discharge rate of battery pack 2 is correspondingly increased to more than 1 C. In this manner, the discharge capacity to be taken out is controlled to be maximized while the amount of entire current of the battery system is ensured.

Next, an example of the operation of the control system regarding the internal output control unit 11 according to the embodiment of the present invention will be described.

First, a case where control is made so as to maximize the depth of discharge (DOD) of battery pack 1 in order to suppress a reduction in capacity of battery pack 1 at high temperature in a non-load condition, will be described. Incidentally, the term "non-load condition" refers to the state where power is not output outside from battery pack 1 and battery pack 2. In the first place, values of the depth of discharge (DOD) of battery pack 1 and battery pack 2 are obtained by the DOD arithmetic unit 13, based on the information on the last charge-discharge operation and the current battery voltage. At this time, assuming that depth of discharge (DOD) of battery pack 1 is 60% and depth of discharge (DOD) of battery pack 2 is 40%, the determination unit 14 determines that the depth of discharge (DOD) of battery pack 1 is controlled to be 100% and the depth of discharge (DOD) of battery pack 2 is controlled to be 0% by charging battery pack 2 with power from battery pack 1 (in this case, battery pack 1 and battery pack 2 are assumed to have the same battery capacities) and sends the instruction to the current control unit 15. The current control unit 15 turns SW1 to 6 on and off in order to form a current pathway, which allows a predetermined amount of current to flow from battery pack 1 to battery pack 2 to charge battery pack 2. At the time when the depth of discharge (DOD) of battery pack 1 and the depth of discharge (DOD) of battery pack 2 reach 100% and 0%, respectively, the charging operation is terminated.

Next, the case where the temperature of battery pack 1, when becoming 0° C. or lower, is controlled to increase up to 20° C. will be discussed. The battery temperature is measured by the temperature measuring unit 12. If the battery temperature is −5° C. herein and DOD values of battery pack 1 and battery pack 2, which are obtained through calculation in the DOD arithmetic unit, are smaller than the preset values (the case where a predetermined or more capacity remains in battery pack 1 and a sufficient capacity remains in battery pack 2 to supply power to the heating portion), the determination unit 14 instructs the current control unit 15 to supply power to the heating portion 18. The current control unit 15 turns SW1 to 6 on and off in order to form a current pathway, which allows a predetermined amount of current to supply from battery pack 2 to the heater of the heating portion 18. At the time when the temperature of battery pack 1 reaches 20° C., power supply is terminated. However, the heating operation of battery pack 1 is preferably performed immediately before power is output to the load device 20.

The 5 V-level battery and 4 V-level battery provided in the battery system according to the embodiment of the present invention will be described below.

(Positive Electrode of 5 V-Level Battery)

The battery system according to the embodiment of the present invention has a 5 V-level battery, a single battery, or a battery pack consisting of 5 V-level single batteries, as a first battery. Incidentally, the term "5 V-level battery" described in the specification may be either a single battery or a battery pack. The 5 V-level battery is a lithium ion secondary battery having a positive electrode (also referred to as a "5 V-level positive electrode") containing a positive electrode active material having an operating potential of 4.5 V or more relative to a lithium metal. More specifically, the 5 V-level battery to be used in the embodiment of the present invention has a positive electrode containing a positive electrode active material having a charge/discharge region of 4.5 V or more relative to a lithium metal.

The positive electrode active material having an operating potential of 4.5 V or more relative to a lithium metal is preferably a lithium-containing composite oxide. Examples of the lithium-containing composite oxide include a spinel-type lithium manganese complex oxide, olivine-type lithium-manganese-containing composite oxide, the inverse spinel-type lithium-manganese-containing composite oxide and $Li_2MnO_3$-solid solution.

In particular, as the positive electrode active material to be used in the 5 V-level positive electrode, a lithium manganese composite oxide represented by the following formula (I) is preferably used.

$$Li_a(M_xMn_{2-x-y}A_y)(O_{4-w}Z_w) \qquad (I),$$

in the formula (I), $0.4 \leq x \leq 1.2$, $0 \leq y$, $x+y<2$, $0 \leq a \leq 1.2$, $0 \leq w \leq 1$, M represents at least one selected from the group consisting of Co, Ni, Fe, Cr and Cu; A represents at least one selected from the group consisting of Li, B, Na, Mg, Al, Ti, Si, K and Ca; and Z represents at least one of F and Cl.

In the formula (I), it is more preferable that M represent Ni alone or a substance containing Ni as a main component and at least one of Co and Fe; A represent at least one of B, Mg, Al and Ti; and Z represent F. Such substitution elements can stabilize a crystal structure and suppress deterioration of the active material.

Other examples of the positive electrode active material that can be used in the 5 V-level positive electrode include olivine composite oxides represented by $Li_xMPO_4F_y$ ($0 \leq x \leq 2$, $0 \leq y \leq 1$, M is at least one of Co and Ni); Si-containing composite oxides represented by $Li_xMSiO_4$ ($0 \leq x \leq 2$, M is at least one of Mn, Fe and Co); and lamellar composite oxides represented by $Li_x[Li_aM_bMn_{1-a-b}]O_2$ ($0 \leq x \leq 1$, $0.02 \leq a \leq 0.3$, $0.1 < b < 0.7$, M is at least one of Ni, Co, Fe and Cr). The positive electrode active materials may be used alone or in combination of two or more.

Examples of the olivine-type positive electrode active material include $LiCoPO_4$ and $LiNiPO_4$.

(Positive Electrode of 4 V-Level Battery)

The battery system according to the embodiment of the present invention has a 4 V-level battery, a single battery, or a battery pack consisting of 4 V-level single batteries, as a second battery. Incidentally, the term "4 V-level battery" described in the specification may be either a single battery or a battery pack. The 4 V-level battery is a lithium ion secondary battery having a positive electrode (also referred to as a "4 V-level positive electrode") containing a positive electrode active material having an operating potential of 4.3 V or less, and preferably 3.5 V or more and 4.3 V or less relative to a lithium metal. As the positive electrode active material to be used in the 4 V-level positive electrode, which is not particularly limited, a lithium-containing composite oxide can be used. As the lithium-containing composite oxide, for example, $LiM1O_2$ (M1 represents at least one element selected from the group consisting of Mn, Fe, Co and Ni and M1 may be partially substituted with Mg, Al or Ti) and $LiMn_{2-x}M2_xO_4$ (M2 represents at least one element selected from the group consisting of Mg, Al, Co, Ni, Fe and B and $0 \leq x < 0.4$) may be used. In addition, an olivine-type material represented by $LiFePO_4$ may be used. These may be non-stoichiometric compositions such as a composition excessively containing Li. Furthermore, these may be used alone or in combination of two or more. Among these, in particular, although a lithium manganese oxide represented by $LiMn_{2-x}M2_xO_4$ mentioned above, has lower capacity than those of lithium cobalt oxide ($LiCoO_2$) and lithium nickel oxide ($LiNiO_2$), the material cost thereof is low since Mn is produced in a large amount compared to Ni and Co, and the thermal stability thereof is high since it has a spinel structure. For this reason, the lithium manganese oxide is preferable as a material for a positive electrode active material directed to large secondary batteries for electric vehicles, power storage and the like. Lithium manganese oxide may be used as a mixture by blending, for example, 15 to 35 mass % of lithium nickel oxide thereto. In this manner, battery capacity can be enhanced while the thermal stability of a positive electrode is maintained.

(Negative-Electrode Active Material)

Although the negative electrode to be used in the 5 V-level battery and the 4 V-level battery according to the embodiment of the present invention is not particularly limited, a carbon material such as graphite and an amorphous carbon may be used, and graphite is preferably used in view of energy density. As a negative-electrode active material, materials that form an alloy with Li, such as Si, Sn and Al, Si oxide, Si composite oxides containing Si and a metal element(s) except Si, Sn oxides, Sn composite oxides containing Sn and a metal element(s) except Sn, $Li_4Ti_5O_{12}$, composite materials obtained by coating these materials with carbon, and the like may be used. The negative-electrode active materials may be used alone or in combination of two or more. The average particle size (D50) of a negative-electrode active material is preferably 5 to 50 μm and more preferably 10 to 30 μm. The specific surface area thereof is preferably 0.5 to 10 $m^2$/g and more preferably 0.5 to 5 $m^2$/g.

(Non-Aqueous Electrolyte Solution)

As the non-aqueous electrolyte solution, a solution obtained by dissolving a lithium salt in a non-aqueous electrolyte solvent, may be used. Incidentally, in the present specification, the "non-aqueous electrolyte solvent" is sometimes also referred to as a "non-aqueous solvent" or a "solvent". Also, the fluorine-containing compound to be used as a non-aqueous electrolyte solvent is sometimes also referred to as a "fluorinated solvent" or a "fluoride solvent".

Examples of the lithium salt include $LiPF_6$, lithium imido salt, $LiAsF_6$, $LiAlCl_4$, $LiClO_4$, $LiBF_4$ and $LiSbF_6$. Examples of the lithium imido salt include $LiN(C_kF_{2k+1}SO_2)(C_mF_{2m+1}SO_2)$ (k and m are each independently 1 or 2). These may be used alone or in combination of two or more.

In the 4 V-level battery, as a non-aqueous solvent, a cyclic carbonate and a linear carbonate are preferably used. Examples of the cyclic carbonate include ethylene carbonate (EC), propylene carbonate (PC), butylene carbonate (BC) and derivatives (including a fluorinated compound) of these. Examples of the linear carbonate include dimethyl carbonate (DMC), diethyl carbonate (DEC), ethyl methyl carbonate (EMC), dipropyl carbonate (DPC) and derivatives (including a fluorinated compound) of these.

Other than these, a solvent such as an aliphatic carboxylic acid ester, γ-lactone, a cyclic ether and a linear ether may be used. Examples of the aliphatic carboxylic acid ester include methyl formate, methyl acetate, ethyl propionate and derivatives (including a fluorinated compound) of these. Examples of the γ-lactone include γ-butyrolactone and a derivative (including a fluorinated compound) thereof. Examples of the cyclic ether include tetrahydrofuran, 2-methyltetrahydrofuran and derivatives (including a fluorinated compound) of these. Examples of the linear ether include 1,2-diethoxyethane (DEE), ethoxymethoxyethane (EME), ethyl ether, diethyl ether and derivatives (including a fluorinated compound) of these. Other examples of the non-aqueous solvent that may be used include dimethyl sulfoxide, 1,3-dioxolane, formamide, acetamide, dimethylformamide, dioxolane, acetonitrile, propionitrile, nitromethane, ethyl monoglyme, phosphoric acid triester, trimethoxy methane, a dioxolane derivative, sulfolane, methyl sulfolane, 1,3-dimethyl-2-imidazolidinone, 3-methyl-2-oxazolidinone, 1,3-propane sultone, anisole, N-methylpyrrolidone and derivatives (including a fluorinated compound) of these. These may be used alone or in combination of two or more.

In the 5 V-level battery, when a non-aqueous solvent mainly containing a cyclic carbonate and a linear carbonate as mentioned above is used, the solvent is oxidatively decomposed on a positive electrode, thereby causing a reduction in battery capacity and generation of a gas. Thus, since the 5 V-level battery is more likely to deteriorate compared to 4 V-level battery, a high oxidation-resistant solvent is preferably used. More specifically, as the non-aqueous electrolyte solvent, at least one selected from the group consisting of a fluorinated phosphoric acid ester represented by the following formula (1), a fluorinated ether represented by the following formula (2) and a sulfone compound represented by the following formula (3) or following formula (4) is preferably included and two or more solvents are more preferably included. In addition to these solvents having high antioxidative property, at least one solvent selected from the group consisting of e.g., cyclic carbonates such as ethylene carbonate (EC) and propylene carbonate (PC) and linear carbonates such as dimethyl carbonate (DMC), diethyl carbonate (DEC) and ethylmethyl carbonate (EMC) may be included.

In the 5 V-level battery, a fluorinated phosphoric acid ester represented by the following formula (1) (hereinafter sometimes simply referred to as a "fluorinated phosphoric acid ester") is preferably included in the non-aqueous solvent.

(1)

in the formula (1), $R^1$, $R^2$ and $R^3$ each independently represent an alkyl group or a fluorinated alkyl group and at least one of $R^1$, $R^2$ and $R^3$ is a fluorinated alkyl group.

In the formula (1), the fluorinated alkyl group refers to an alkyl group having at least one fluorine atom. In the formula (1), the number of carbon atoms of $R^1$, $R^2$ and $R^3$ is preferably each independently 1 to 3. At least one of $R^1$, $R^2$ and $R^3$ is preferably a fluorinated alkyl group in which 50% or more of hydrogen atoms of the corresponding unsubstituted alkyl group are substituted with fluorine atoms. More preferably, all of $R^1$, $R^2$ and $R^3$ are fluorinated alkyl groups in which 50% or more of hydrogen atoms of the corresponding unsubstituted alkyl groups are substituted with fluorine atoms. This is because when the content of fluorine atoms is large, voltage resistance is more improved and deterioration of the battery capacity after cycle can be more reduced even if a positive electrode active material workable at a potential of 4.5 V or more relative to lithium is used. The ratio of the number of fluorine atoms relative to the total number of hydrogen atoms and fluorine atoms in a fluorinated alkyl group is more preferably 55% or more.

Examples of the fluorinated phosphoric acid ester include, but are not particularly limited to, tris(trifluoromethyl) phosphate, tris(trifluoroethyl) phosphate, tris(pentafluoroethyl) phosphate, tris(trifluoropropyl) phosphate, tris(tetrafluoropropyl) phosphate, tris(pentafluoropropyl) phosphate, tris (heptafluorobutyl) phosphate and tris(octafluoropentyl) phosphate. Examples of the fluorine-containing phosphate ester include trifluoroethyl dimethyl phosphate, bis(trifluoroethyl)methyl phosphate, bis-trifluoroethyl ethyl phosphate, pentafluoropropyl dimethyl phosphate, heptafluorobutyl dimethyl phosphate, trifluoroethyl methyl ethyl phosphate, pentafluoropropyl methyl ethyl phosphate, heptafluorobutyl methyl ethyl phosphate, trifluoroethyl methyl propyl phosphate, pentafluoropropyl methyl propyl phosphate, heptafluorobutyl methyl propyl phosphate, trifluoroethyl methyl butyl phosphate, pentafluoropropyl methyl butyl phosphate, heptafluorobutyl methyl butyl phosphate, trifluoroethyl diethyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate and heptafluorobutyl dibutyl phosphate. Examples of the tris(tetrafluoropropyl) phosphate include tris(2,2,3,3-tetrafluoropropyl) phosphate. Examples of the tris(pentafluoropropyl) phosphate include tris(2,2,3,3,3-pentafluoropropyl) phosphate. Examples of the tris(trifluoroethyl) phosphate include tris(2,2,2-trifluoroethyl) phosphate (hereinafter simply also abbreviated as TTFP). Examples of the tris(trifluoropropyl) phosphate include tris(3,3,3-trifluoropropyl) phosphate. Examples of the tris(heptafluorobutyl) phosphate include tris(1H,1H-heptafluorobutyl) phosphate. Examples of the tris(octafluoropentyl) phosphate include tris(1H,1H,5H-octafluoropentyl) phosphate. Among these, tris(2,2,2-trifluoroethyl) phosphate (TTFP) is preferable since the effect of suppressing decomposition of an electrolyte solution at a high potential is high. The fluorine-containing phosphate esters may be used alone or in combination of two or more.

In the 5 V-level battery, the non-aqueous electrolyte solvent preferably contains a fluorinated ether represented by the following formula (2). In the present specification, a fluorinated ether represented by the following formula (2) is sometimes referred to simply as a "fluorinated ether".

$$R_{101}-O-R_{102} \quad (2)$$

in the formula (2), $R_{101}$ and $R_{102}$ each independently represent an alkyl group or a fluorinated alkyl group and at least one of $R_{101}$ and $R_{102}$ is a fluorinated alkyl group.

The total number of carbon atoms in $R_{101}$ and $R_{102}$ is preferably 10 or less. The alkyl group and fluorinated alkyl group in the formula (2) include linear or branched alkyl and fluorinated alkyl groups, respectively.

The fluorinated alkyl group refers to an alkyl group having at least one fluorine atom. In the formula (2), the content of fluorine atom(s) in the fluorinated alkyl group is preferably 50% or more and more preferably 60% or more relative to the total of fluorine atoms and hydrogen atoms. When the content of fluorine atom(s) is large, voltage resistance is more improved and even if a positive electrode active material workable at a potential of 4.5 V or more relative to lithium is used, deterioration of the battery capacity after the cycle can be more efficiently reduced.

Of the fluorinated ethers, a fluorinated ether represented by the following formula (2-1) is more preferable.

$$X^1-(CX^2X^3)_n-O-(CX^4X^5)_m-X^6 \quad (2\text{-}1)$$

in the formula (2-1), n and m are each independently an integer of 1 to 8. $X^1$ to $X^6$ each independently represent a fluorine atom or a hydrogen atom, with the proviso that at least one of $X^1$ to $X^6$ is a fluorine atom; when n is 2 or more, a plurality of $X^2$ and $X^3$ are mutually independent; and when m is 2 or more, a plurality of $X^4$ and $X^5$ are mutually independent.

The fluorinated ether is more preferably a compound represented by the following formula (2-2) in view of voltage resistance and compatibility with other electrolytes.

$$X^1-(CX^2X^3)_n-CH_2O-CX^4X^5-CX^6X^7-X^8 \quad (2\text{-}2)$$

in the formula (2-2), n is an integer of 1 to 7, $X^1$ to $X^8$ are each independently a fluorine atom or a hydrogen atom; with the proviso that at least one of $X^1$ to $X^3$ is a fluorine atom and at least one of $X^4$ to $X^8$ is a fluorine atom.

In the formula (2-2), when n is 2 or more, a plurality of $X^2$ may be the same or different each other and a plurality of $X^3$ may be the same or different each other.

In view of voltage resistance and compatibility with other electrolytes, the fluorinated ether compound is further preferably a compound represented by the following formula (2-3).

$$H-(CY^1Y^2-CY^3Y^4)_n-CH_2O-CY^5Y^6-CY^7Y^8-H \quad (2\text{-}3)$$

In the formula (2-3), n represents 1, 2, 3 or 4; and $Y^1$ to $Y^8$ each independently represent a fluorine atom or a hydrogen atom, with the proviso that at least one of $Y^1$ to $Y^4$ is a fluorine atom and at least one of $Y^5$ to $Y^8$ is a fluorine atom.

In the formula (2-3), when n is 2 or more, a plurality of $Y^1$ to $Y^4$ may be the same or different each other.

Specific examples of the fluorinated ether include $CF_3OCH_3$, $CF_3OC_2H_5$, $F(CF_2)_2OCH_3$, $F(CF_2)_2OC_2H_5$, $CF_3(CF_2)CH_2O(CF_2)CF_3$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $(CF_3)(CF_2)CH_2O(CF_2)_2H$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CHF)_2CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2OCH_2(CF_2)_2F$, $CF_3CHFCF_2OCH_2CF_2CF_2H$, $H(CF_2)_4CH_2O(CF_2)_2H$, $CH_3CH_2O(CF_2)_4F$, and $F(CF_2)_4CH_2O(CF_2)_2H$. Among these, $H(CF_2)_2CH_2O(CF_2)_2H$ is preferable as a fluorinated ether compound. The fluorinated ether compounds may be used alone or in combination of two or more.

In the 5 V-level battery, the non-aqueous electrolyte solvent preferably contains at least one of the sulfone compounds represented by the following formula (3) or the following formula (4) (hereinafter sometimes also simply referred to as a "sulfone compound")

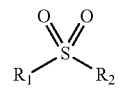
(3)

in the formula (3), $R_1$ and $R_2$ each independently represent a substituted or unsubstituted alkyl group.

In a sulfone compound represented by the formula (3), the number $n_1$ of carbon atoms of $R_1$ and the number $n_2$ of carbon atoms of R2 preferably satisfy the relationship: $1 \leq n_1 \leq 12$, $1 \leq n_2 \leq 12$, respectively, and more preferably $1 \leq n1 \leq 6$, $1 \leq n_2 \leq 6$, and further preferably, $1 \leq n_1 \leq 3$, $1 \leq n_2 \leq 3$. Furthermore, a linear, branched or a cyclic alkyl group is included in the alkyl group.

$R_1$ and $R_2$ may have a substituent. Examples of the substituent include an alkyl group having 1 to 6 carbon atoms (for example, methyl, ethyl, propyl, isopropyl, butyl and isobutyl groups), an aryl group having 6 to 10 carbon atoms (for example, phenyl and naphthyl groups) and a halogen atom (for example, chlorine, bromine and fluorine atoms). Among these, an alkyl group having 1 to 6 carbon atoms or an aryl group having 6 to 10 carbon atoms is more preferable.

Examples of the sulfone compounds represented by the formula (3) include ethyl methyl sulfone, ethyl isopropyl sulfone, ethyl isobutyl sulfone, dimethyl sulfone and diethyl sulfone. Among these, dimethyl sulfone, ethyl methyl sulfone, ethyl isopropyl sulfone and ethyl isobutyl sulfone are preferable, and dimethyl sulfone is more preferable.

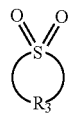

(4)

in the formula (4), $R_3$ represents a substituted or unsubstituted alkylene group.

In connection with $R_3$, the number of carbon atoms of the alkylene group is preferably 4 to 9, and further preferably 4 to 6.

In connection with $R_3$, examples of the substituent include an alkyl group having 1 to 6 carbon atoms (for example, methyl, ethyl, propyl, isopropyl and butyl groups) and halogen atoms (for example, chlorine, bromine and fluorine atoms). Among these, an alkyl group having 1 to 6 carbon atoms is more preferable.

Of the sulfone compounds represented by the formula (4), a cyclic sulfone compound represented by the following formula (4-1) is preferable.

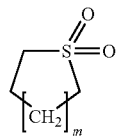

(4-1)

in the formula (4-1), m is an integer of 1 to 6.

In the formula (4-1), m is an integer of 1 to 6 and preferably an integer of 1 to 3.

Preferable examples of the cyclic sulfone compounds represented by the formula (4) include tetramethylene sulfone (sulfolane), pentamethylene sulfone and hexamethylene sulfone. Among these, sulfolane is more preferable. Preferable examples of a cyclic sulfone compound having a substituent include 3-methyl sulfolane and 2,4-dimethyl sulfolane.

As the non-aqueous solvent for the 5 V-level battery, for example, a solvent mixture containing a cyclic carbonate and at least two types of solvents selected from fluorinated phosphoric acid ester, fluorinated ether and a sulfone compound is preferably used and a solvent mixture containing at least three types of solvents is more preferably used. When at least three types of solvents are used in the mixture, an electrolyte solution having relatively satisfactory compatibility with solvents, oxidation resistance and ion conductivity can be obtained.

As the electrically conductive aid in electrodes, in both a positive electrode and a negative electrode, for example, a carbon material such as carbon black, granular graphite, flake graphite and carbon fiber may be used. In particular, low-crystalline carbon black is preferably used in the positive electrode.

As the positive electrode current collector, for example, aluminum, stainless steel, nickel, titanium or an alloy of these may be used. As the negative electrode current collector, for example, copper, stainless steel, nickel, titanium or an alloy of these may be used.

An electrode is obtained by dispersing and kneading, for example, an active material, a binder and an electrically conductive aid in predetermined amounts in a solvent containing N-methyl-2-pyrrolidone (NMP) or water, and applying the slurry obtained to a current collector to form an active material layer. The obtained electrode may be compressed by a method such as a roll press method so as to be controlled to have an appropriate density.

(Separator)

As the separator, which is not particularly limited, for example, a porous film formed of a polyolefin such as polypropylene and polyethylene or a fluorine resin and an inorganic separator formed of cellulose or glass may be used.

(Outer Package)

As the outer package, for example, a can such as coin-shaped, rectangular and cylindrical cans and a laminate package may be used. In view of reduction in weight and improvement of the battery energy density, a laminate package using a flexible film formed by laminating a synthetic resin and a metal foil is preferable. Since a laminate-type battery is excellent in heat dissipation, it is suitable as an in-vehicle battery for electric vehicles or the like.

In the case of the laminate-type secondary battery, as the outer package, for example, an aluminum laminate film, SUS-made laminate film, a laminate film formed of e.g., polypropylene or polyethylene coated with silica and the like may be used. In particular, in view of suppression of volume expansion and cost, an aluminum laminate film is preferably used.

(Secondary Battery)

The structure of the secondary battery according to the embodiment of the present invention is not particularly limited; for example, the secondary battery is constituted by housing an electrode element having a positive electrode and a negative electrode disposed so as to face each other and an electrolyte solution in an outer package. Although the shape of the secondary battery is not particularly limited, examples thereof include cylindrical, flat wound rectangular, laminated rectangular, coin type, flat wound laminate, or layered laminate type is mentioned.

EXAMPLES

Experimental Example 1

Battery group a having 8-Ah battery pack 1, in which eight of 1-Ah 5 V-level single batteries are connected in parallel, and 2-Ah battery pack 2, in which two of 1-Ah 4 V-level single batteries are connected in parallel, was constituted such that the total rating capacity was 10 Ah. In Battery group a, the capacity ratio of battery pack 1 relative to the total capacity of battery pack 1 and battery pack 2 is 80%. Similarly, Battery group b having a 6-Ah battery pack 1 (5 V-level batteries) and a 4-Ah battery pack 2 (4 V-level batteries) and a capacity ratio of battery pack 1 of 60%, and Battery group c having a 4-Ah battery pack 1 (5 V-level batteries) and a 6-Ah battery pack 2 (4 V-level batteries) and a capacity ratio of battery pack 1 of 40%, were constituted. At −10° C., a current having a current value (10 A) corresponding to a discharge rate of 1 C was supplied to the above battery groups a, b and c having a capacity ratio of battery pack 1 of 80%, 60% and 40%, respectively, and discharge capacity taken out when the values of current (discharge rate) supplied to battery pack 1 and battery pack 2 were changed, was measured. To describe it more specifically, when the current value of battery pack 1 is 4 A, the current value of battery pack 2 becomes 6 A (=10−4 (A)). The discharge rates of battery pack 1 and battery pack 2 vary depending upon the values of the rating capacity of the respective battery packs.

Figure 5:
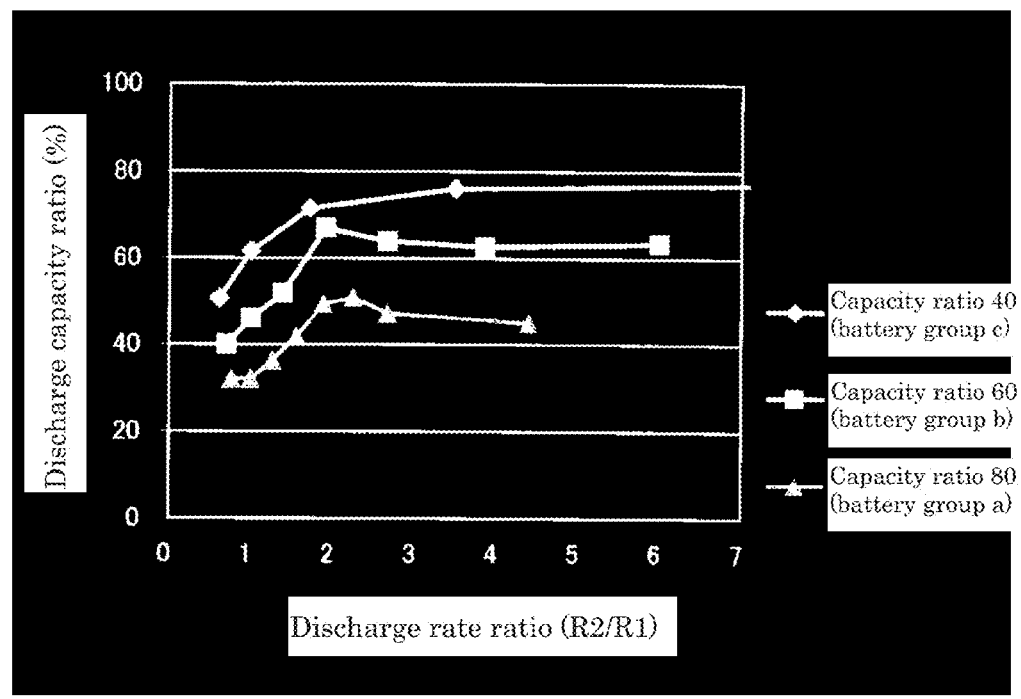
FIG. 5 shows the results of Experimental Example 1.

The relationship between the ratio (R2/R1) of discharge rate (R2) of battery pack 2 relative to the discharge rate (R1) of battery pack 1, and the discharge capacity ratio (%), which is obtained by dividing the discharge capacity (Ah) obtained from battery groups a, b, and c by the rating capacity (10 Ah), is shown in FIG. 5. Incidentally, although at the time of initiation of measurement, output can be obtained from both battery pack 1 and battery pack 2; however, at the time when discharge of one of the battery packs is terminated, a current of 10 A is to be supplied only to the other battery pack. The discharge capacity obtained at this time is to be added.

Since the rate characteristics of battery pack 1 are lower than the rate characteristics of battery pack 2, the discharge capacity tends to increase as the capacity ratio of battery pack 1 decreases in the order of 80%, 60% and 40%, and it is found that the discharge capacity of a battery group having an R2/R1 ratio beyond 1 tends to increase. In particular, in the case where the capacity ratio of battery pack 1 is 80% or 60%, it is found that there are peaks at an R2/R1 ratio of around 2.

As a result, it was demonstrated that, in the battery system having battery pack 1 consisting of 5 V-level batteries and battery pack 2 consisting of 4 V-level batteries, the ratio (R2/R1) of the discharge rate (R1) of battery pack 1 and discharge rate (R2) of battery pack 2 is 1 or more. More specifically, the discharge rate of battery pack 1 is preferably equal to or less than the discharge rate of battery pack 2, in other words, the discharge rate of battery pack 1 is preferably made lower than the discharge rate of battery pack 2. In addition, it was demonstrated that when the capacity ratio of battery pack 1 consisting of 5 V-level batteries is 60% or more of the total capacity of battery pack 1 and battery pack 2, the ratio R2/R1 is more preferably 1.5 to 2.7.

Experimental Example 2

Figure 6:
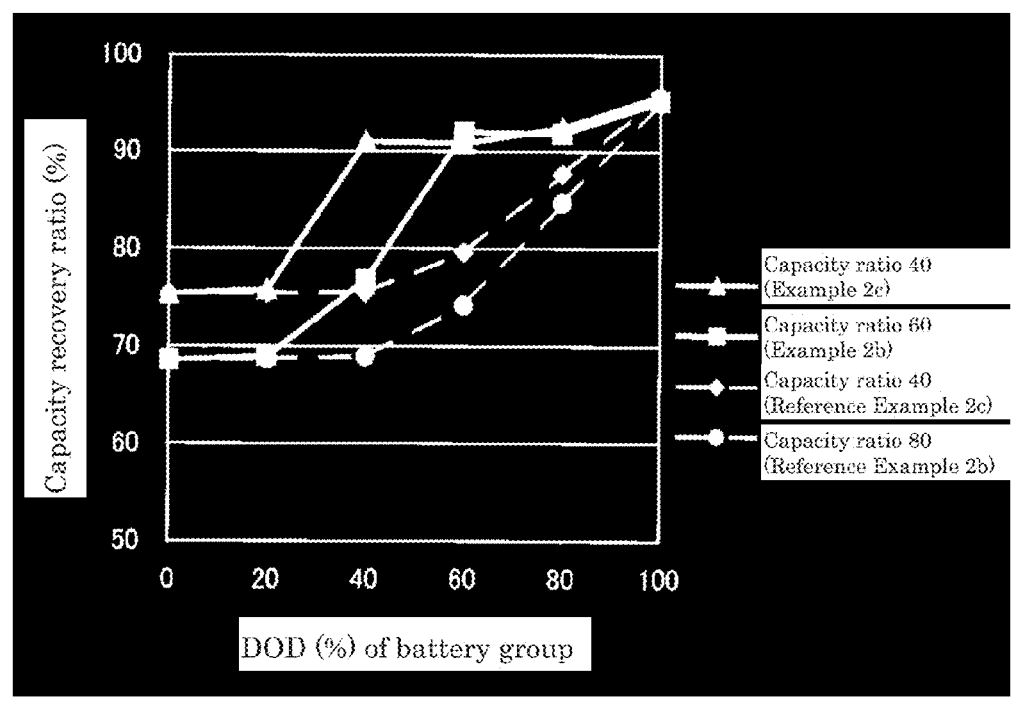
FIG. 6 shows the results of Experimental Example 2.

With respect to Battery group c in which the capacity ratio of battery pack 1 is 40% and Battery group b in which the capacity ratio of battery pack 1 is 60%, prepared in the same manner as in Experimental Example 1, in a non-load condition, for a case where the values of depth of discharge (DOD) of battery pack 1 and battery pack 2 were controlled to be the same (they were designated as Reference Example 2c and Reference Example 2b, respectively), and a case where they were controlled such that the depth of discharge (DOD) of battery pack 1 was maximized and the depth of discharge (DOD) of battery pack 2 was minimized by charging battery pack 2 with power from battery pack 1 (they were designated as Example 2c and Example 2b, respectively), the capacity recovery ratios (%) of the battery groups after these battery groups were stored at 45° C. for 8 weeks, were calculated. The results are shown in FIG. 6. The capacity recovery ratio (%) of a battery group herein refers to the ratio (%) of the total value of recover capacity (Ah) of battery pack 1 and battery pack 2 after storage relative to the total value (10 Ah) of rating capacity of battery pack 1 and battery pack 2. From FIG. 6, it was demonstrated that the capacity recovery ratios of Reference Examples and Examples do not differ at a depth of discharge (DOD) of 20% or less, but the capacity recovery ratios of Examples are higher than those of Reference Examples at a depth of discharge (DOD) beyond 20%.

Thus, in the battery system having a 5 V-level battery(s) and a 4 V-level battery(s) in a non-load condition, it is preferable that the 4 V-level battery(s) is (are) charged with power from a 5 V-level battery(s) so as to control the depth of discharge (DOD) of the 5 V-level battery(s) to be increased, because deterioration of the battery capacity of the battery system can be thereby suppressed. It is more preferable that the depth of discharge (DOD) of the 5 V-level battery(s) is (are) maximized, and the depth of discharge (DOD) of the 4 V-level battery(s) is (are) minimized.

REFERENCE SIGNS LIST

1 Battery pack consisting of 5 V-level batteries
2 Battery pack consisting of 4 V-level batteries
10 Battery control unit
11 Internal output control device
12 Temperature measuring unit
13 DOD arithmetic unit
14 Determination unit
15 Current control unit
16a, 16b Current sensor
17a, 17b Temperature sensor
18 Heating portion
19 External output control unit
20 Load device
SW1 to 6 Switching element

The invention claimed is:
1. A battery system comprising:
a first battery comprising a lithium ion secondary battery having a positive electrode comprising a positive electrode active material having an operating potential of 4.5 V or more relative to a lithium metal,
a second battery comprising a lithium ion secondary battery having a positive electrode comprising a positive electrode active material having an operating potential of 4.3 V or less relative to a lithium metal, and
a mechanism for outputting power outside from both the first battery and the second battery,
wherein
the discharge rate of the first battery is equal to or less than the discharge rate of the second battery.
2. A battery system comprising:
a first battery comprising a lithium ion secondary battery having a positive electrode comprising a positive electrode active material having an operating potential of 4.5 V or more relative to a lithium metal,
a second battery comprising a lithium ion secondary battery having a positive electrode comprising a positive electrode active material having an operating potential of 4.3 V or less relative to a lithium metal, and
a mechanism for charging the second battery by outputting power thereto from the first battery,
wherein
the depth of discharge (DOD) of the first battery is higher than the depth of discharge (DOD) of the second battery during non-load time.

3. A battery system comprising:
a first battery comprising a lithium ion secondary battery having a positive electrode comprising a positive electrode active material having an operating potential of 4.5 V or more relative to a lithium metal and a heating portion,
a second battery comprising a lithium ion secondary battery having a positive electrode comprising a positive electrode active material having an operating potential of 4.3 V or less relative to a lithium metal, and
a mechanism for heating the first battery by outputting power from the second battery to the heating portion of the first battery.

4. The battery system according to claim 1, further comprising a mechanism for charging the second battery by outputting power thereto from the first battery, wherein the depth of discharge (DOD) of the first battery is higher than the depth of discharge (DOD) of the second battery during non-load time.

5. The battery system according to claim 1, wherein
the first battery further comprises a heating portion, and
the battery system comprises a mechanism for heating the first battery by outputting power from the second battery to the heating portion of the first battery.

6. The battery system according to claim 1, wherein the ratio (R2/R1) of the discharge rate (R1) of the first battery and the discharge rate (R2) of the second battery falls within the range of 1.5 to 2.7.

7. The battery system according to claim 2, wherein the depth of discharge of the first battery is maximized and the depth of discharge of the second battery is minimized during non-load time.

8. The battery system according to claim 3, wherein when the first battery is 0° C. or lower, the first battery is heated to a temperature higher than 0° C. and 30° C. or lower.

9. The battery system according to claim 1, wherein the positive electrode active material having an operating potential of 4.5 V or more comprises a compound represented by the following formula (I):

$$Li_a(M_xMn_{2-x-y}A_y)(O_{4-w}Z_w) \quad (I)$$

where $0.4 \leq x \leq 1.2$, $0 \leq y$, $x+y<2$, $0 \leq a \leq 1.2$, $0 \leq w \leq 1$; M represents at least one selected from the group consisting of Co, Ni, Fe, Cr and Cu; A represents at least one selected from the group consisting of Li, B, Na, Mg, Al, Ti, Si, K and Ca; and Z represents at least one of F and Cl.

10. The battery system according to claim 1, wherein a non-aqueous electrolyte solution constituting the first battery comprises a cyclic carbonate and further comprises at least one of a fluorinated ether, a fluorinated phosphoric acid ester and a sulfone-based solvent.

11. The battery system according to claim 1, wherein the first battery and/or the second battery is a battery pack.

* * * * *